July 26, 1927.
J. KIRCHENSTEINER
MOTOR BRAKE
Filed Nov. 19, 1923
1,637,117
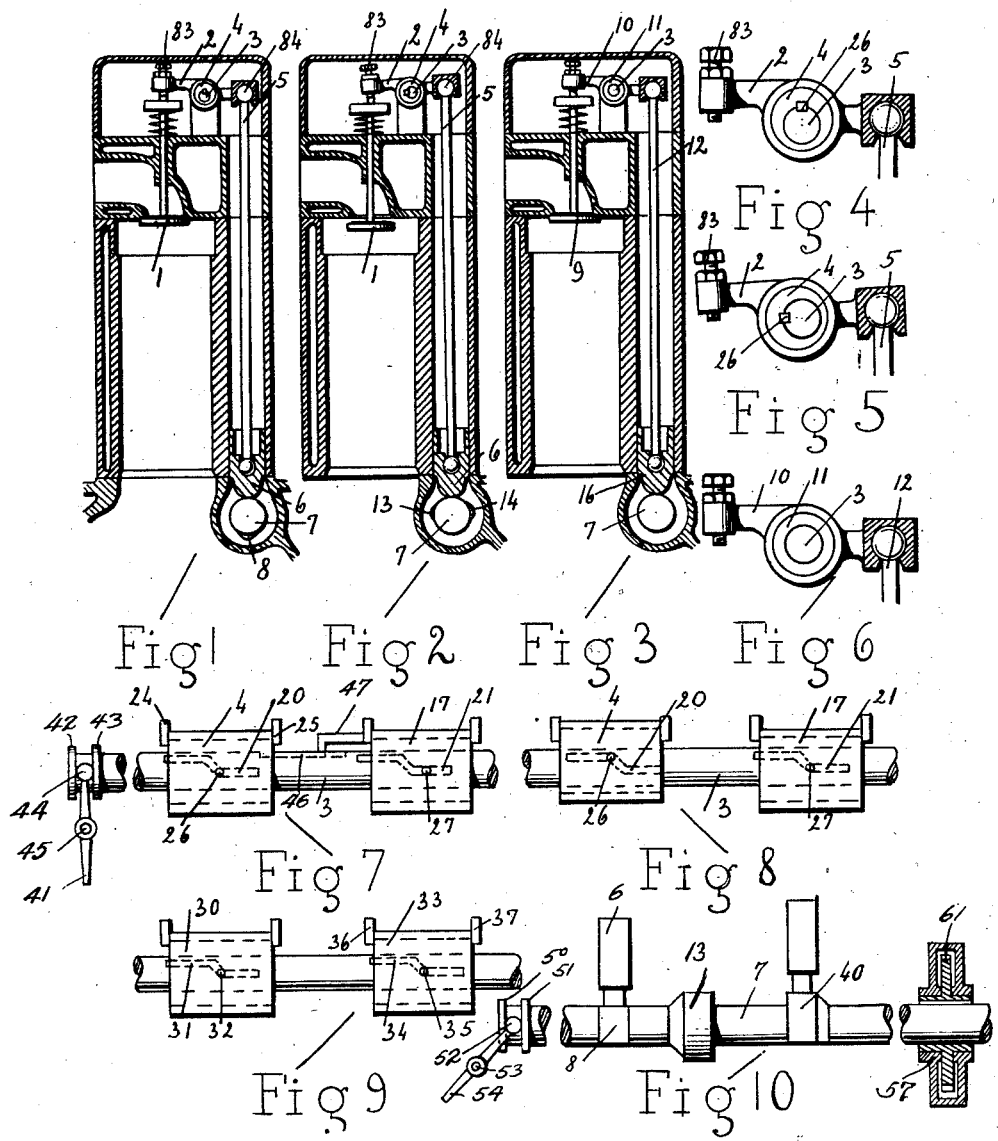
WITNESSES
INVENTOR Patented July 26, 1927.

1,637,117

UNITED STATES PATENT OFFICE.

JOHANN KIRCHENSTEINER, OF WETZIKON, SWITZERLAND.

MOTOR BRAKE.

Application filed November 19, 1923, Serial No. 675,752, and in Germany May 29, 1923.

My invention relates to a motor brake for autos and has for its object the regulation of the resistance which the motor brake develops.

Reference is to be had to the accompanying drawing, in which

Fig. 1 is a cylinder section with closed exhaust valve.

Fig. 2 a cylinder section with open exhaust valve.

Fig. 3 a cylinder section with closed inlet valve.

Figs. 4 to 6 inclusive show details of levers.

Figs. 7 to 9 arrangement for the regulation of the movement of the levers, which operate the exhaust valves.

Fig. 10 a part of the cam shaft.

According to Figure 1 the motor works as a power engine and the cam 8 of the cam shaft 7 opens the exhaust valve 1 as soon as the exhaust gases have to escape into the atmosphere. Therefore the shifter 6 operates the lever 2, which is pivoted at 3. An eccentric 4 is fitted to the shaft 3 for each exhaust lever 2. For the inlet lever 10 according to Figure 3 a concentric ring 11 is fixed on the shaft 3. In Figure 3 the inlet valve 9 is closed. The levers with their eccentrics and rings are shown in Figs. 4, 5, 6 in a larger scale.

While in Figure 1 the motor works as a power engine the motor would act as a motor brake according to Figure 2. In Figure 1 the exhaust cam 8 operates the exhaust valve 1, while in Figure 2 the auxiliary cams 13, 14 open and close the exhaust valve 1. There is an eccentric 4, fixed on the shaft 3, which will be described later. If the eccentric has the position, shown in Figures 1 and 4, the auxiliary cams 13, 14 operate the valve 1 so that the latter can be closed entirely. In case the resistance of the motor brake should be reduced, the valve 1 should be kept open more and less. This is reached by turning the eccentric from position of Figure 4 into position of Figure 5. The auxiliary cams are able to open the valve 1 to the full height, but are not able to close it. According to the position of the eccentric 3 the valve 1 will remain open more or less to the required resistance of the motor brake.

According to Figure 10 it will be explained how to put cam 8 out of work and make the cams 13, 14 operate. According to Figures 7 to 9 it will be stated how to shift the eccentric 4 into the different positions. At first it should be explained how the motor brake acts and how the motor is changed into the motor brake. If the motor acts as a power engine, according to Figure 1, the cams 8 opens the exhaust valve 1 and another cam operates the inlet valve 9. As soon as the motor should act as a motor brake the camshaft 7 is shifted lengthwise and the cam 8 is put out of work and also the cam for the inlet valve 9. Now the auxiliary cams 13, 14 work. Therefore the motor works as a compressor in the following way:

The inlet valve 9 does not work at all, but the exhaust valve 1 acts now as the air inlet valve. When the piston goes downward the cam 13 opens the valve 1 and air is sucked into the cylinder. When the piston goes upward, the air will be compressed and develops a high resistance. Near the upper dead point the valve 1 is opened by cam 14 and the compressed air rushed into the atmosphere. Going downward the valve 1 is kept open by the cam 14 and the air is sucked into the cylinder. Going upward the air is compressed again. As soon as the air is compressed, it develops always a high resistance and acts as a brake. All cylinders of the motor can act as a motor brake. In case all cylinders develop a too high resistance, it would be desirable to reduce the latter. Therefore in one or several cylinders no resistance should be developed. This is reached by keeping the valve 1 always open. For this reason the eccentric 4 is turned and is put into the position of Figure 5. In this position the valve 1 cannot be closed as the left part of lever 2 is pressed down by the eccentric 4. How to turn the eccentric 4 of the different levers and how to regulate the different cylinders is shown in the Figures 7 to 9.

Fig. 7 shows the shaft 3 with the grooves 20 and 21 and the eccentrics 4 and 17. Both eccentrics are placed inside of the hubs of the levers which operate the exhaust valves of two cylinders. The levers are not shown but only the hubs with the eccentrics inside. The hubs cannot move lengthwise as the arresters 24, 25 keep them in place. Pins 26 (Figure 5) and 27 are fixed to the inside of the eccentrics. If the shaft 3 is moved to the right, the pin 26 must follow the slot 20 and the eccentric 4 is turned and takes the position, shown in Figure 5. Therefore the lever 2 (Figure 2) is pressed down, valve 1 cannot close and no resistance takes place in the cylinder. If the shaft 3 is moved further, the eccentric 17 is turned by pin 27, following the slot 21, and the next cylinder does not develop any resistance.

According to Figures 7 and 8 both cylinders are released after each other, but according to Figure 9 another modification is shown. In Figure 9 both cylinders are released at the same time. If the shaft is shifted to the right, both the pin 32 and pin 35 turn the eccentrics 30—33 at the same time as soon as they reach the grooves 31 and 34 and therefore the levers of the exhaust valves are pressed down at the same time. Both exhaust valves cannot be closed and therefore both cylinders cannot work as a compressor. The hubs of the levers cannot move lengthwise as the arresters 36, 37 keep them in place. The shaft 3 has two offsets 42, 43. A fork 44 of the lever 41, which is pivoted at 45, rests between the two offsets 42, 43. As the shaft 3 should not rotate, the latter is fitted with a groove 46. A fixed key 47 slides inside of the groove. As soon as the shaft 3 should be shifted, the lever 41 is turned to the right or to the left.

Fig. 10 shows a part of the cam shaft fitted with the regular cams for the motor and auxiliary cams. At the same time Figure 10 shows the shifting part of the cam shaft. The cams are flattened against the cam shaft, so that the shifter 6 can slide very easily over the cams as soon as the cam shaft is shifted lengthwise. The exhaust valve cam 8 operates the exhaust valve and cam 40 the suction valve, when the motor is working as a power engine. When the motor acts as a brake the cams 8 and 40 leave their place and the auxiliary cams 13, 14 take the place of cam 8. The cam shaft 7 has two offsets 50, 51. A fork 52 of the lever 54, which is pivoted at 53, rests between the two offsets 50, 51. The driving gear 61 is kept in place by the bearing 57. The gear 61 is fitted with a groove, in which a key of the cam shaft 7 is guided.

As soon as the cam shaft 3 should be shifted the lever 54 is turned to the right or to the left. The key of the cam shaft 7 is shifted through the groove of the gear 61.

I claim:

1. In an engine of the type in which the engine acts as an explosion engine and a motor brake, the combination of a plurality of cylinders, overhead valves, a shaft with grooves movable lengthwise, levers for operating the valves mounted on the shaft, eccentrics with pins, guided inside of the grooves of the shaft, the eccentrics mounted inside of the hubs of the levers for operating the exhaust valves, means for shifting the shaft lengthwise whereby the exhaust valves are kept open for relieving the resistance of the compression of the motor brake.

2. In an engine of the type in which the engine acts as an explosion engine and a motor brake, the combination of a plurality of cylinders, overhead valves, a shaft with grooves movable lengthwise, levers for operating the valves mounted on the shaft, eccentrics with pins, guided inside of the grooves of the shaft, the eccentrics mounted inside of the hubs of the levers for operating the exhaust valves, means for shifting the shaft lengthwise whereby the exhaust valves are kept open more or less for relieving the resistance of the compression of the motor brake, a cam shaft movable lengthwise, cams to actuate the inlet and outlet valves, while the engine is operating as a motor, auxiliary cams adapted to in turn actuate the exhaust valves to make said engine act as brake, as soon as the cam shaft is shifted lengthwise.

In testimony whereof I affix my signature.

JOHANN KIRCHENSTEINER.